United States Patent [19]
Ambrus

[11] Patent Number: 6,076,667
[45] Date of Patent: Jun. 20, 2000

[54] SAFETY DEVICE TO PREVENT THE UNLAWFUL APPROPRIATION OF SHOP GOODS

[76] Inventor: Sándor Z. Ambrus, 4 Highview Crescent, Suite 3, Toronto, Ontario, Canada, M6H 2Y2

[21] Appl. No.: 09/304,985

[22] Filed: May 4, 1999

[51] Int. Cl.[7] .................................................. B65D 85/57
[52] U.S. Cl. ................................. 206/308.2; 206/387.11; 206/807
[58] Field of Search ................................. 206/1.5, 308.2, 206/387.11, 807; 70/63

[56] References Cited

U.S. PATENT DOCUMENTS

| | | | |
|---|---|---|---|
| 5,718,332 | 2/1998 | Tachibana | 206/308.2 |
| 5,901,840 | 5/1999 | Nakasuji | 206/1.5 |
| 5,904,246 | 5/1999 | Weisburn et al. | 206/308.2 |

FOREIGN PATENT DOCUMENTS

| | | | |
|---|---|---|---|
| 2688483 | 9/1993 | France | 206/387.11 |

*Primary Examiner*—David T. Fidei
*Attorney, Agent, or Firm*—Riches, McKenzie & Herbert; Jeffrey Pervanas

[57] ABSTRACT

A safety device to prevent the unlawful appropriation of shop goods, especially video, audio and other data carrying devices, is disclosed. The device comprises a case with an internal opening for accommodating the goods and an opening for placing the goods in the internal space. The device also comprises a covering element which covers the opening at least partially and a partial fixing unit for locking the covering element. A signal providing partial unit is placed within the internal space of the case to signal when the unit has been improperly removed from a location. The signal providing partial unit has a single loop-shaped wire aerial returning to itself and an electric partial unit inserted between the two ends of the wire aerial. The internal side of the bordering wall of the case or the internal side of the covering element is provided with intermediate sections and the signal providing partial unit is fixed safely by the intermediate sections in the internal space of the case.

20 Claims, 1 Drawing Sheet

SAFETY DEVICE TO PREVENT THE UNLAWFUL APPROPRIATION OF SHOP GOODS

FIELD OF THE INVENTION

The present invention relates to a safety device to prevent the unlawful appropriation of shop goods, especially to protect video, audio and other data carrying equipment, which contains a case with an internal space suitable for accommodating the goods, a filling opening for putting the goods in the internal space of the case, a covering element which covers the filling opening at least partly, a partial fixing unit for locking the covering element, and a signalling partial unit is connected to the inside of the bordering wall of the case.

BACKGROUND OF THE INVENTION

Several solutions have become known to prevent the unlawful appropriation of the goods introduced and offered for sale in the different shops. Among these there are the safety systems in the case of which the products intended to be protected are equipped with passive aerials, so-called goods protecting labels, made of metal foil, fixed on a paper or plastic carrier, and in the shop, practically near the exits, there are receiver-transmitter partial units radiating signals at a determined frequency. When these are in operation, if an active goods protecting label gets into the protected area, the safety system alarms with the help of sound and light effects, and prevents the goods from being taken out of the shop unlawfully.

Such devices are described in patent specifications No. EP 704.591 and FR 2.727 549.

However, in the case of products which are supplied for the shops in a cases, boxes or in some other packaging, there is the possibility of that the person intending to misappropriate the product tries the take it out of the selling place by leaving the packaging behind. Such products are, among other, tapes, CD-s or computer discs suitable for recording and storing audio and video signals.

Safety devices have also been developed for the protection of video, audio and other data carrying devices. The essence of these is that the goods, with their original packaging, are put in a case that can be locked, practically made of transparent material, also accommodating the packaging. The partial unit which activates the safety equipment is placed in the internal space of the safety device, next to the goods intended to be protected.

Such safety devices equipped with a storing space are described among others in patent specifications No. WO 92/08026, U.S. Pat. No. 5,147,034 and WO 97/16615, while information relating to signalling units which activate the different safety equipment is contained among others in patent specification No. WO/96241 19.

However, the defect of the known safety devices is that the separate signalling partial unit put in the internal space which accommodates the goods may be easily damaged in the course of putting the goods in the internal space and taking them out of there, and it may result in the failure of the alarm.

In the case of the signalling partial units connected to the protective case it is a problem that, especially in the case of the cases for the protection of the CD-s, the goods intended to be protected shades the signalling partial unit with radio-frequency, and so the partial unit is not able to emit signals of appropriate intensity and to turn on the safety device.

It must also be regarded as a disadvantage, that the manufacturing cost of the known signalling partial units put in the internal space of the protective case is relatively high, and it is still susceptible to breaking down.

It is also unfavourable that in the interest of reaching appropriate sensitivity the known signalling partial units are relatively spacious, and due to this in many cases they often cover information important for the customer on the packaging of the goods to be protected, and so their application may be a disturbing, purchase impeding factor.

SUMMARY OF THE INVENTION

Our aim with the packaging according to the sample is to overcome the defects of the known safety devices and to create a version which makes it possible to create a simple construction which is resistant to physical exposures and is equipped with a signalling partial unit which can be appropriately fixed in the internal space of the case and which is able to give a signal the intensity of which suits the safety equipment under all circumstance, independently from the material or size of the goods to be protected.

The safety device according to the sample was resulted by the recognition that if the signalling partial unit is constructed differently from the usual, and it is put and fixed in the internal space of the case in a specific way different from the known ways, then the task can be solved.

Suiting the set aim the safety device according to the utility model to prevent the unlawful appropriation of shop goods, especially to protect video, audio and other data carrying devices, which contains a case with an internal space suitable for accommodating the goods, a filling opening for putting the goods in the internal space of the case, a covering element which covers the filling opening at least partly, a partial fixing unit for locking the covering element, and a signalling partial unit is placed in the internal space of the case, is constructed in a way that the signal providing partial unit has a single loop-shaped wire aerial returning to itself, and it has an electric partial unit inserted between the one end and the other end of the wire aerial, the internal side of the bordering wall of the case and/or the internal side of the covering element is provided with intermediate sections, and the signal providing partial unit is fixed safely by the intermediate sections in the internal space of the case.

Another criterion of the safety device according to the utility model can be that at least one section of the wire aerial is placed near or practically adjusted to the connection line of the side elements forming the bordering wall.

In the case of a planned construction of the safety device the electric partial unit contains a circuit disc and a capacitive element fixed to the circuit disc and/or an inductive element.

In the case of another construction of the sample the intermediate sections are pins made of the material of the case, forming an organic unit with it, stretching towards the internal space of the case, and their free ends, in their fixed position, are bent onto the wire aerial of the signal providing partial unit.

In the case of a further version of the safety device the intermediate sections are formed by bedding spots made of afterhardening material, placed on the internal side of the bordering wall of the case, and the wire aerial of the signal providing partial unit and/or the circuit disc of the electric partial unit are pressed into the bedding spots while they are still soft.

It is favourable from the aspect of the creation of the sample, if the proportion of the index-number of the length of the wire aerial of the signal providing partial unit expressed in mm and the index-number of the area surrounded by the wire aerial expressed in mm² is at least 1:1.

The safety device according to the utility model has several advantageous characteristic features. Among these the most important is that its application excludes the damaging of the signal providing partial unit in the course of putting the goods to be protected in the internal space of the case or taking them out of there, and due to this it is able to start the alarm equipment with significantly higher safety.

Due to the specific construction and position of the wire aerial of the signal providing partial unit the sensitivity of the safety device improves and the signal emitted by it becomes more intensive which has a favourable influence on the desired operation of the safety equipment.

It must also be regarded as favourable that due to the position of the wire aerial the goods to be protected do not shade the electric elements forwarding the signals, not even in the case of CD-s, and so the signalling ability and reliability of the safety device is increased even more.

It must also be regarded as an advantage that the running and of the wire aerial and its fixing to the case also excludes the possibility of the signal providing partial unit covering some information important for the customers on the packaging of the goods intended to be protected and thus causing some inconvenience for the customers or the sales-persons during or after the purchase.

It must also be mentioned as an advantage that the manufacturing of the signal providing partial unit and its placement in the case does not need special manufacturing devices, special manufacturing technology or special expensive materials, so even in the case of small series it can be easily produced.

BRIEF DESCRIPTION OF THE DRAWINGS

The sample is described in more detail in connection with the construction example. In the drawing FIG. No. 1. is the view of a possible construction of the safety device according to the sample, FIG. No. 2. is the part showing the connection between the signal providing partial unit and the case, partly in shown in section

DETAILED DESCRIPTION OF THE INVENTION

Figure 1:
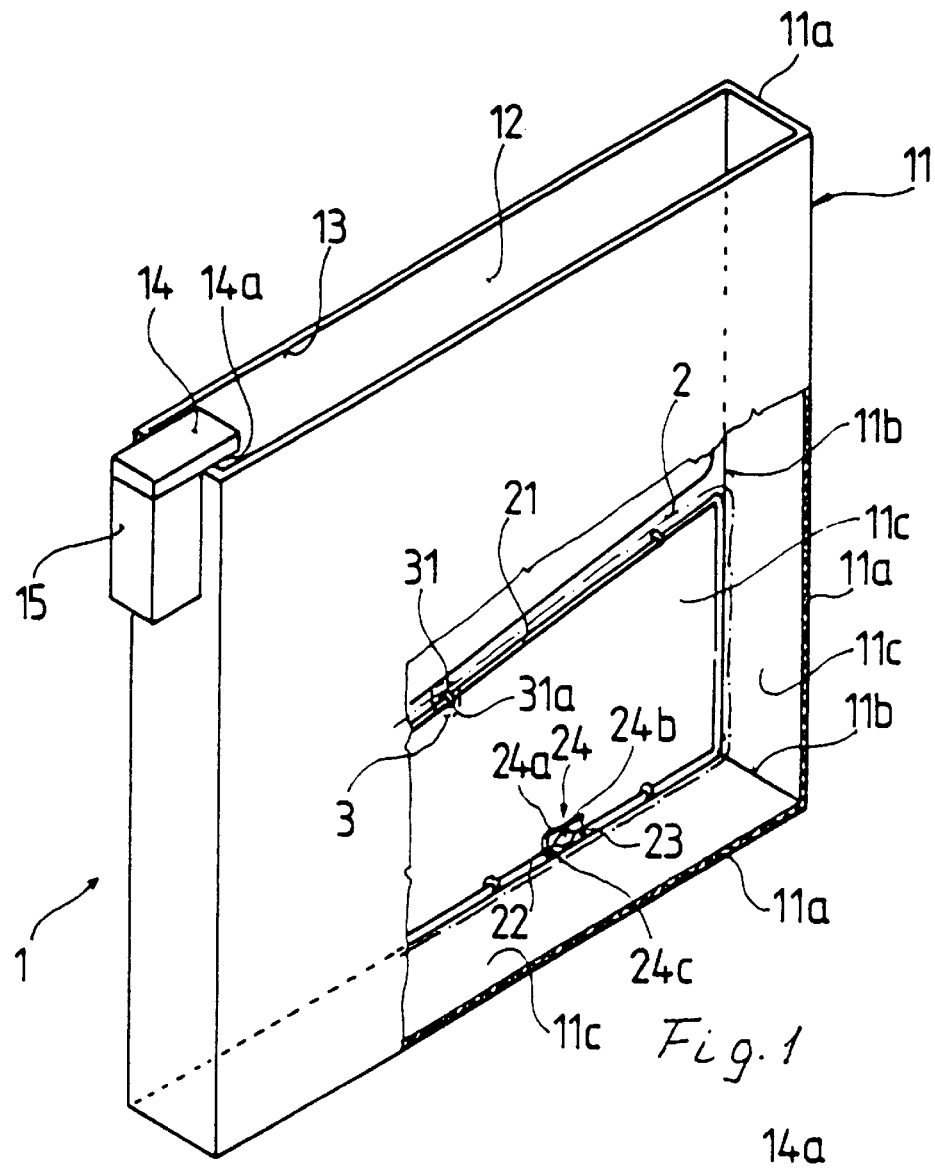
Figure 2:
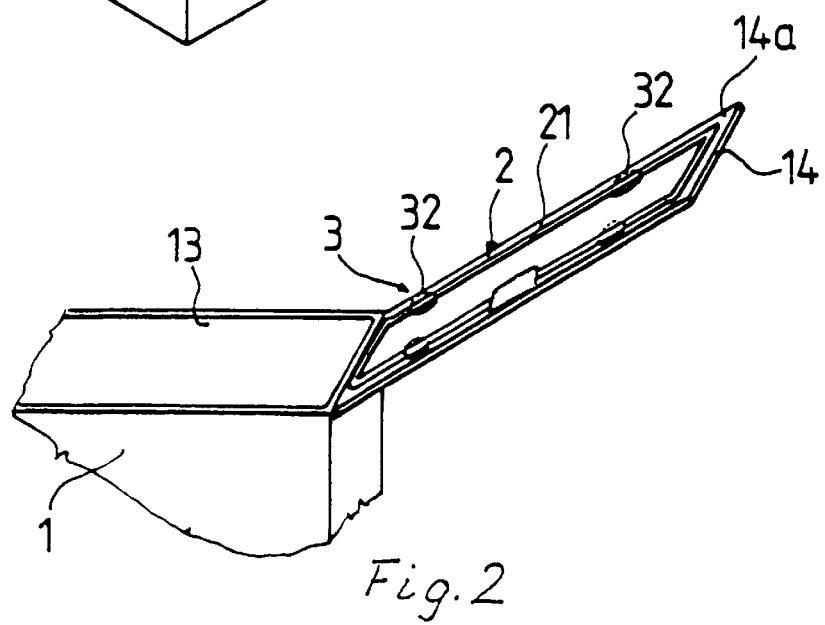

In FIG. No. 1. a possible construction of the safety device according to the sample can be seen. The 1 case containing the 12 internal space surrounded by the 11 bordering wall composed from the 11a side elements can be seen in the 11 bordering wall of which the 13 filling opening is constructed. The 13 filling opening, in the case of the present construction, is partly closed by the 14 covering element equipped with the 15 fixing partial unit, where the 15 fixing partial unit ensures the closed position of the 14 covering element, and a specific auxiliary device is needed to open it.

Of course the 14 covering element can be moved so that during the period when the goods to be protected are put in, it leaves the 13 filling opening free and then closes it after the goods to be protected have been put in.

The 2 signal providing partial unit is situated inside the 12 internal space of the 1 case, it contains the 21 wire aerial and the 24 electric partial unit connected between the 22 one end and the 23 other end of the 21 wire aerial. In the case of the present construction the 24 electric partial unit is assembled from the 24a circuit disc and the 24b capacitive element placed on the 24a circuit disc. Another version is also possible in the case of which a 24c inductive element is also placed on the 24a circuit disc, but it is not necessary as the 21 wire aerial itself can be regarded as an inductive member. From the above it can be seen that the 2 signal providing partial unit is in fact an oscillating circuit which, in the case of the input of a determined energy package, with a decay of a given period, emits a signal in proportion with the amount of energy received.

FIG. No. 1. also demonstrates that the 21 wire aerial of the 2 signal providing partial unit is a single loop-like plane form returning to itself, and practically at least one part of it is fixed to the 11c internal side in the 12 internal space of the 1 case, practically along the 11b connection line of the 11a side elements forming the 11 bordering wall of the 1 case. It must be pointed out here that in the interest of improving the radiation characteristics of the 21 wire aerial made of metal, the external surface of the 21 wire aerial can be provided with a coating which can be silver-coating practically.

The 1 case and the 21 wire aerial of the 2 signal providing partial unit are connected by the 3 intermediate sections which, in the case of the present construction, are 31 pins made of the material of the 1 case and stretching in the 12 internal space of the 1 case. The 31a free ends of the 31 pins are constructed and placed here so that the 21 wire aerial of the 2 signal providing partial unit can be stringed onto them, and after bumping the 21 wire aerial to the 11a side elements of the 1 case, the 31a free ends of the 31 pins stretch over the 21 wire aerial. Due to this basic situation the 31a free ends of the 31 pins, in their fixed position, can be bent back onto the 21 wire aerial. It must be pointed out here that in the interest of achieving the favourable signal transmitting characteristics the position of the 31 pins must be chosen so that the proportion between the index-number of the "h" length of the 21 wire aerial measured in mm and the index-number of the values of the "A" area surrounded by the 21 wire aerial measured in mm² must be at least 1:1.

When making the safety device according to the sample, the 1 case is produced in itself, in the known way, from water-clean transparent material, practically by injection moulding, and from its 11 a side elements forming the 11 bordering wall 31 pins stretch out towards the 12 internal space of the 1 case on the desired places. After this a 21 wire aerial is made the running of which is determined by the 31 pins of the 11a side elements forming the 11 bordering walls of the 1 case and the 11b connections lines of the 11a side elements, and the 22 one end and the 23 other end of which are connected to the 24 electric partial unit also in a traditional way, for example by soldering, and thus the 2 signal providing partial unit of the desired size and shape is produced.

After the 2 signal providing unit has been made, the 21 wire aerial is stringed onto the 31 pins, and it is put in contact with 11 bordering wall of the 1 case so that each of the 31 pins stretch over the 21 wire aerial. Finally the 31a free ends of the 31 pins are bent onto the 21 wire aerial with a hot tool, and so it is fixed in the 12 internal space of the 1 case in the desired position.

FIG. No. 2. shows a part of a safety device version where the 2 signal providing unit is fixed to the 14a internal side of the 14 covering elements which closes the 13 filling opening of the 1 case completely in this case, and the 3 intermediate sections are the 32 bedding spots made of the afterhardening material, for example glue material, placed on the 14a internal side of the 14 covering element. In this case, in order to create safe fixing between the 21 wire aerial and the 1 case, first 32 bedding spots are dropped on the desired paces, then the 21 wire aerial is pressed into these 32 bedding spots while they are still in a liquid state, and we wait until the 32 bedding spots become hard. Then the 21 wire aerial of the 2 signal providing partial unit is connected to the 1 case by the hardened material in the 32 bedding spots.

It is obvious now that the 2 signal providing partial unit can be fitted not only on the 11 bordering wall of the 1 case, but also on the 14a internal side of the 14 covering element, and even another version is possible which is the combination of the above two.

The safety device according to the sample can be used well to prevent the unlawful appropriation of goods in shops where there is electronic, radio frequency alarm operated safety equipment.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

What is claimed is:

1. A safety device to prevent unlawful appropriation of goods, said safety device comprising:
   a case with an internal space suitable for accommodating the goods;
   a filling opening for putting the goods in the internal space of the case;
   a covering element which covers the filling opening at least partly;
   a partial fixing unit for locking the covering element; and
   a signaling partial unit placed in the internal space of the case;
   wherein the signal providing partial unit (2) has a single loop-shaped wire aerial (21) returning to itself and an electric partial unit (24) inserted between a first end (22) and a second end (23) of the wire aerial (21), an internal side (11c) of a bordering wall (11) of the case (1) is provided with intermediate sections (3), and the signal providing partial unit (2) is fixed safely by the intermediate sections (3) in the internal space (12) of the case (1).

2. A safety device as in claim 1, wherein at least one section of the wire aerial (21) is placed near a connection line (11b) of side elements (11a) forming the bordering wall (11).

3. A safety device as defined in claim 1, wherein the electric partial unit (24) includes a circuit disc (24a) and a capacitive element (24b) fixed onto the circuit disc (24).

4. A safety device as defined in claim 1, wherein the intermediate sections (3) are pins (31) integrally formed of the case (1), stretching towards the internal space (12) of the case (1), and the free ends (31a), in their fixed position, are bent onto the wire aerial (21) of the signal providing partial unit (2).

5. A safety device as defined in claim 1, wherein the intermediate sections (3) are formed by bedding spots (32) made of afterhardening material, placed on the internal side of the bordering wall (11) of the case (1), and the wire aerial (21) of the signal providing partial unit (2) is pressed into the bedding spots (32) while they are still soft.

6. A safety device as defined in claim 1, wherein the proportion of the length (h) of the wire aerial (21) and the area (A) surrounded by the wire aerial (21) is at least 1:1.

7. A safety device as defined in claim 1, wherein the goods are data carrying devices.

8. A safety device as defined in claim 1, wherein the data carrying devices contain data selected from the group consisting of audio data, video data, a combination of video and audio data and computer-executable data and instructions.

9. A safety device as claimed in claim 1, wherein the electric partial unit (24) includes a circuit disc (24a) and an inductive element (24c) fixed onto the circuit disc (24).

10. A safety device as claimed in claim 1, wherein the intermediate sections (3) are formed by bedding spots (32) made of afterhardening material, placed on the internal side of the bordering wall (11) of the case (1), and the circuit disc (24a) of the electric partial unit (24) is pressed into the bedding spots (32) while they are still soft.

11. A safety device to prevent unlawful appropriation of goods, said safety device comprising:
    a case with an internal space suitable for accommodating the goods;
    a filling opening for putting the goods in the internal space of the case;
    a covering element which covers the filling opening at least partly;
    a partial fixing unit for locking the covering element; and
    a signaling partial unit placed in the internal space of the case;
    wherein the signal providing partial unit (2) has a single loop-shaped wire aerial (21) returning to itself and an electric partial unit (24) inserted between a first end (22) and a second end (23) of the wire aerial (21), an internal side (14a) of the covering element (14) is provided with intermediate sections (3), and the signal providing partial unit (2) is fixed safely by the intermediate sections (3) in the internal space (12) of the case (1).

12. A safety device as in claim 11, wherein at least one section of the wire aerial (21) is placed near a connection line (11b) of side elements (11a) forming the bordering wall (11).

13. A safety device as defined in claim 11, wherein the electric partial unit (24) includes a circuit disc (24a) and a capacitive element (24b) fixed onto the circuit disc (24).

14. A safety device as defined in claim 11, wherein the intermediate sections (3) are pins (31) integrally formed of the case (1), stretching towards the internal space (12) of the case (1), and the free ends (31a), in their fixed position, are bent onto the wire aerial (21) of the signal providing partial unit (2).

15. A safety device as defined in claim 11, wherein the intermediate sections (3) are formed by bedding spots (32) made of afterhardening material, placed on an internal side of the bordering wall (11) of the case (1), and the wire aerial (21) of the signal providing partial unit (2) is pressed into the bedding spots (32) while they are still soft.

16. A safety device defined as in claim 11, wherein the proportion of the length (h) of the wire aerial (21) and the area (A) surrounded by the wire aerial (21) is at least 1:1.

17. A safety device as defined in claim 11, wherein the goods are data carrying devices.

18. A safety device as defined in claim 11, wherein the data carrying devices contain data selected from the group consisting of audio data, video data, a combination of video and audio data and computer-executable data and instructions.

19. A safety device as claimed in claim 11, wherein the electric partial unit (24) includes a circuit disc (24*a*) and an inductive element (24*c*) fixed onto the circuit disc (24).

20. A safety device as claimed in claim 11, wherein the intermediate sections (3) are formed by bedding spots (32) made of afterhardening material, placed on the internal side of the bordering wall (11) of the case (1), and the circuit disc (24*a*) of the electric partial unit (24) is pressed into the bedding spots (32) while they are still soft.

* * * * *